Patented Dec. 22, 1953

2,663,728

UNITED STATES PATENT OFFICE 2,663,728

HYDROXY AND METHOXY CYCLOHEXYL-BENZOYLPROPIONIC ACIDS

Robert R. Burtner, Skokie, Ill., assignor to G. D. Searle & Co., Chicago, Ill., a corporation of Illinois No Drawing. Application June 30, 1951,
Serial No. 234,675

5 Claims. (Cl. 260—520)

This invention relates to cycloalkylbenzoylaliphatic acids containing hydroxyl and alkoxyl substituents in the aromatic nucleus, to salts thereof, and to methods for producing such compounds. More particularly this invention relates to compounds of the general structural formula

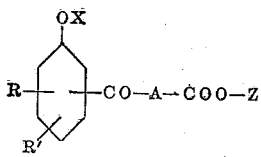

wherein R is a cycloalkyl radical, R' is a lower alkyl, hydrogen, lower alkoxyl, halogen or hydroxyl radical, X is hydrogen or a lower alkyl radical, A is a bivalent hydrocarbon radical and Z is hydrogen or one equivalent of a cation.

This application is a continuation-in-part of my copending application Serial No. 93,412, filed May 14, 1949, now abandoned.

In the foregoing structural formula, R represents alicyclic radicals such as cyclohexyl, cyclopentyl, cyclobutyl, cycloheptyl, as well as alkyl derivatives of such radicals. X represents hydrogen or lower alkyl radicals such as methyl, ethyl, propyl, isopropyl, butyl, isobutyl, secondary-butyl, tertiary-butyl, and the like. R' represents lower alkyl and lower alkoxyl radicals such as the foregoing, and halogen, hydrogen, and hydroxyl radicals. The bivalent hydrocarbon radical represented by A contains 2 to 10 carbon atoms and may be straight- or branch-chained. It may be saturated or unsaturated. The preferred radical represented by A is the ethylene radical, although related alkylene radicals such as propylene, butylene, and amylene, and polymethylene radicals are within the scope of this invention. Alkylene radicals containing aromatic substituents such as phenyl and tolyl groups and unsaturated aliphatic hydrocarbon radicals containing 1 or 2 double bonds, such as vinylene and allylene, are likewise within the scope of this invention. Z represents hydrogen or a cation such as an alkali metal ion, an ammonium ion or an amine ion.

It is the object of this invention to provide novel chemical substances of the foregoing type. It is a further object of this invention to provide simple and economical methods of producing such substances. It is still another object to provide feasible synthetic methods for the foregoing substances from readily available starting materials.

The compounds of this invention are prepared by reacting a cycloalkylphenyl alkyl ether with a dibasic aliphatic acid anhydride or halide derived from a dibasic acid of the following formula

with a Friedel-Crafts type catalyst, generally in an inert organic solvent. Among such catalysts are anhydrous aluminum chloride, anhydrous ferric chloride, stannic chloride, boron trifluoride, zinc chloride, hydrogen fluoride, sodium-aluminum chloride and similar substances. The inert solvents are organic liquids having chemical reactivities lower than that of the foregoing ether and include nitrobenzene, carbon disulfide, chlorobenzene, tetrachloroethane, and related substances. Among the dibasic acid anhydrides and halides which can be used in preparing these compounds are succinic, glutaric, glutaconic, adipic, pimelic, suberic, sebacic, maleic, fumaric, traumatic and related dibasic acids. The unsaturated keto acids obtained from unsaturated acid anhydrides or halides may be converted to saturated keto acids by catalytic reduction according to conventional methods. Conversely the saturated keto acids may be converted to unsaturated keto acids by halogenation followed by dehydrohalogenation according to methods set forth hereinafter.

The compounds which comprise this invention are useful as intermediates in chemical syntheses. They are also useful as therapeutic agents generally, and in particular are effective choleretic agents administerable in the form of the free acids or in the form of water soluble salts. They are also useful as antibacterial agents.

Salts of the acids which comprise this invention are generally prepared by reacting the acids with an aqueous solution of alkali or of an organic amine such as a lower alkyl, dialkyl, or trialkyl amine or corresponding alkanol amine, filtering the solution so formed and evaporating the filtrate to dryness, generally under low pressure and at low temperature. In certain instances the salts of the acids of this invention may be obtained in crystalline form by salting out said salts with a simple inorganic salt such as sodium chloride, sodium sulfate or ammonium chloride. Alternatively salts of the acids of this invention can be prepared by reacting an alcoholic solution of the acid with an alcoholic solution of an alkali or an amine. The salts are often insoluble in the alcohol and may be isolated as precipitates. In other instances the salts may be thrown down by the addition of a second solvent in which the salt is insoluble. Among such solvents are ether, benzene, chloroform and carbon tetrachloride.

My invention is disclosed in further detail by means of the following examples which are set forth for the purpose of illustrating the invention and which are in no way to be construed as limiting the invention in spirit or in scope. It will be apparent to those skilled in the art that many conventional modifications in solvent, temperature, catalyst, and reagents can be adopted without departure from the intent and purpose of this invention. Relative amounts of materials are given in parts by weight.

Example 1

95 parts of o-cyclohexylanisole and 50 parts of succinic anhydride suspended in 600 parts of nitrobenzene at 5° C. are reacted over 30 minutes with good agitation with 134 parts of anhydrous aluminum chloride. The mixture is maintained at 3–7° C. during the addition and for 2 hours longer, efficient agitation being maintained throughout. The reaction mixture is allowed to stand at room temperature for about 15 hours and is then quenched with dilute hydrochloric acid and ice. The mixture is steam distilled to remove solvent and the aqueous residue is chilled and filtered. The crystalline $\beta$-(3-cyclohexyl-4-methoxybenzoyl)-propionic acid is washed with water and dissolved in 2000 parts of hot water containing 30 parts of sodium hydroxide. The hot solution is treated with decolorizing charcoal, filtered, chilled, and acidified. A fine granular precipitate of $\beta$-(3-cyclohexyl-4-methoxybenzoyl) propionic acid is collected on a filter, rinsed with water, dried, and then recrystallized from toluene. This acid melts at about 161° C.

Example 2

58 parts of $\beta$-(3-cyclohexyl-4-methoxybenzoyl) propionic acid suspended in 580 parts of glacial acetic acid at 50–55° C. are reacted with a solution of 67.2 parts of bromine in 200 parts of glacial acetic acid over a period of one hour. The reaction mixture is agitated for one hour longer at 50–55° C. and then evaporated under vacuum to yield a light-colored viscous oil. This oily residue is agitated and refluxed with 32.8 parts of anhydrous sodium acetate in 200 parts of glacial acetic acid. The reaction mixture is poured into 2000 parts of cold water and the granular yellow precipitate is separated and dissolved in 1000 parts of water containing 25 parts of sodium carbonate at room temperature. The resulting solution is treated with decolorizing charcoal at room temperature, filtered, and acidified. The precipitate of $\beta$-(3-cyclohexyl-4-methoxy-benzoyl) acrylic acid soon granulates. It is separated, washed, and dried and then recrystallized from methanol to yield yellow crystals melting at about 180° C.

Example 3

95 parts of o-cyclohexylanisole are reacted in 600 parts of nitrobenzene with 50 parts of maleic anhydride in the presence of 139 parts of anhydrous aluminum chloride by the procedure of Example 1. After the reaction mixture is quenched and steam distilled the crude residual acid is taken up in 2000 parts of water containing 65 parts of sodium carbonate at room temperature, filtered, and acidified. The precipitate of $\beta$-(3-cyclohexyl-4-methoxybenzoyl)-acrylic acid soon granulates. This is separated, washed, and recrystallized from methanol. It forms bright yellow crystals melting at about 178° C. The mixed-melting point of this product with the product of Example 2 is not depressed.

Example 4

144.5 parts of p-cyclohexylanisole are reacted with 76 parts of succinic anhydride in 900 parts of nitrobenzene in the presence of 204 parts of anhydrous aluminum chloride according to the method of Example 1. The acid is isolated according to the method of Example 1. After recrystallization from toluene followed by recrystallization from methanol $\beta$-(5-cyclohexyl-2-methoxybenzoyl) propionic acid forms clusters of needles melting at about 159° C.

Example 5

To 44 parts of p-cyclohexylphenyl isopropyl ether and 20 parts of succinic anhydride in 250 parts of nitrobenzene at 5–10° C. are added with good mixing in 25 minutes 54 parts of anhydrous aluminum chloride. The mixture is agitated at 5–8° C. for 1 hour longer, then placed in an ice bath and allowed to come to room temperature over a period of 12 hours. The mixture is quenched in ice and acid, steam distilled and chilled. The residue of $\beta$-(5-cyclohexyl-2-isopropoxybenzoyl) propionic acid is taken up in 800 parts of hot 2% caustic soda solution, agitated with decolorizing carbon, filtered and chilled. The filtrate is then acidified with dilute hydrochloric acid and a precipitate of purified $\beta$-(5-cyclohexyl-2-isopropoxybenzoyl) propionic acid is obtained. This acid is collected and dried.

Example 6

$\beta$-(5-cyclohexyl-2-methoxybenzoyl) acrylic acid can be formed from 95 parts of p-cyclohexylanisole, 50 parts of maleic anhydride, and 139 parts of anhydrous aluminum chloride and 600 parts of nitrobenzene according to the method of Example 3. The product so obtained melts at 139° C. and does not depress the melting point of the compound of Example 9.

Example 7

63 parts of p-cyclohexylanisole and 58.9 parts of $\delta$-carbomethoxyvaleryl chloride in 400 parts of nitrobenzene at 5–10° C. are treated with 88 parts of anhydrous aluminum chloride over a period of 30 minutes. The reaction mixture is stirred for 3 hours at 0° C. and then allowed to stand for 15 hours at room temperature. It is quenched in ice and acid, and steam distilled to remove volatile materials. The residue is then extracted with ether and the ether solution is evaporated, yielding an oily residue of methyl $\delta$-(2-methoxy-5-cyclohexylbenzoyl) valeric acid. This is dissolved in 400 parts of methanol containing 40 parts of sodium hydroxide and refluxed for 30 minutes. Approximately one half of the solvent is removed under vacuum and the remaining solution is diluted with 1000 parts of water. The resulting solution is washed with ether to remove neutral material and then acidified to form a viscous precipitate of $\delta$-(2-methoxy-5-cyclohexylbenzoyl) valeric acid. This material is separated, dried, and then crystallized from cyclohexane. After recrystallization from methanol it forms colorless crystals melting at about 95° C.

Example 8

204 parts of o-cyclohexylphenetole and 184 parts of sebacic anhydride in 1250 parts of nitrobenzene at 3–8° C. are treated over a period of 40 minutes with good agitation with 270 parts of anhydrous aluminum chloride. After the addition is complete the mixture is agitated for 2½ hours at 0–8° C. It is then left in ice for 16 hours, during which time the ice melts and the mixture comes to room temperature. It is poured into an excess of ice and hydrochloric acid and the resulting mixture is distilled with steam to remove nitrobenzene. The residue is separated from the aqueous layer by decantation. It is then taken up in 4000 parts of 1.5% sodium hydroxide solution at 65° C. The hot solution is agitated with activated charcoal and a filter aid, filtered and chilled. Upon acidification there is formed a precipitate of ω-(3-cyclohexyl-4-ethoxybenzoyl)pelargonic acid.

Example 9

β-(5-cyclohexyl-2-methoxybenzoyl)acrylic acid is prepared from β-(5-cyclohexyl-2-methoxybenzoyl)propionic acid according to the method of Example 2. The crude material is dissolved in 350 parts of ether and extracted with 3% sodium carbonate solution. The alkaline extract is made acid and the precipitate of oily β-(5-cyclohexyl-2-methoxybenzoyl)acrylic acid is formed. This material is separated by decantation, dried, dissolved in ether, and allowed to evaporate. By trituration in cold ethyl acetate there are obtained crystals of this acid which after recrystallization from ethyl acetate form bright yellow needles melting at 137–138° C.

Example 10

4-cyclohexylresorcinol dimethyl ether is prepared from 4-cyclohexylresorcinol by methylation with dimethyl sulfate in dilute alkali. It distills at about 121° C. at 0.3 mm. pressure; $n_D^{24}=1.5361$. It can also be produced by the reaction of resorcinol dimethyl ether with cyclohexyl bromide in carbon disulfide in the presence of anhydrous aluminum chloride. This substance can be most readily prepared by the methods published by me in the Journal of the American Chemical Society, vol. 75, page 2341 (1953).

354 parts of anhydrous aluminum chloride are added over 15–30 minutes to an agitated suspension of 290 parts of 4-cyclohexylresorcinol dimethyl ether and 132 parts of succinic anhydride in 1600 parts of nitrobenzene at 5° C. The mixture is agitated for about an hour at 5° C. and then for 4 hours at room temperature. It is quenched in ice and acid, steam distilled, chilled and the tacky precipitate separated from the aqueous layer. The precipitate is taken up in 15,000 parts of 2% sodium carbonate solution at 85° C. The hot solution is treated with activated carbon, filtered, chilled and acidified. The precipitate of β-(2,4-dimethoxy-5-cyclohexylbenzoyl)propionic acid soon granulates. It is crystallized from toluene and from benzene and melts at about 168° C.

Example 11

A solution of 100 parts of β-(3-cyclohexyl-4-methoxybenzoyl)propionic acid in 1200 parts of hydriodic acid (specific gravity 1.7) and 250 parts of acetic anhydride is refluxed for 20 minutes. The solution is then poured into 2000 parts of ice water and the precipitate is collected on a filter, washed with water and dried. After recrystallization from ethyl acetate β-(3-cyclohexyl-4-hydroxybenzoyl)propionic acid melts at about 194° C.

Example 12

A mixture of 44 parts of β-(5-cyclohexyl-2-methoxybenzoyl)propionic acid, 400 parts of 47% hydriodic acid and 88 parts of acetic anhydride is refluxed for 20 minutes. The mixture is poured into 800 parts of ice water and a viscous oil precipitates. This soon crystallizes and is then collected on a filter, washed and dried. It is dissolved in an excess of 2% sodium hydroxide solution, filtered and then acidified. The precipitate of β-(5-cyclohexyl-2-hydroxybenzoyl)propionic acid is separated, washed and recrystallized from ethyl acetate. It melts at about 126° C.

The demethylation may also be carried out with aluminum chloride as follows: 10 parts of β-(5-cyclohexyl-2-methoxybenzoyl)propionic acid and 20 parts of anhydrous aluminum chloride in 78 parts of chlorobenzene are heated at about 60° C. with good agitation for 30 minutes. The mixture is quenched in ice and acid, the solvent is removed by steam distillation and the residue is separated by decantation and dissolved in 150 parts of 2.5% sodium hydroxide solution. The alkaline solution is treated with decolorizing charcoal, filtered, and acidified. The precipitate of β-(5-cyclohexyl-2-hydroxybenzoyl)propionic acid soon granulates. It is triturated with water, filtered and dried. This acid melts at about 126° C. and is identical with that prepared above, as shown by mixed-melting point determinations.

Example 13

A mixture of 10 parts of ω-(3-cyclohexyl-4-methoxybenzoyl)pelargonic acid in 125 parts of hydriodic acid (specific gravity 1.7) and 25 parts of acetic anhydride is refluxed for 25 minutes. The resulting solution is poured into 200 parts of ice water. There is formed a precipitate of ω-(3-cyclohexyl-4-hydroxybenzoyl)pelargonic acid. This acid is separated from the aqueous medium and dried.

Example 14

80 parts of δ-(5-cyclohexyl-2-methoxybenzoyl)-valeric acid, 950 parts of hydriodic acid (sp. g. 1.7) and 160 parts of acetic anhydride are refluxed for 15 minutes. δ-(5-cyclohexyl-2-hydroxybenzoyl)valeric acid is isolated as in Example 13. After recrystallization from cyclohexane it forms colorless needles melting at about 98° C.

Example 15

A solution of 149 parts of bromine in 300 parts of glacial acetic acid is added in 15 minutes to a stirred suspension of 255 parts of β-(3-cyclohexyl-4-hydroxybenzoyl)-propionic acid in 2550 parts of glacial acetic acid at 60° C. The solution is agitated at 60° C. for 30 minutes longer, then evaporated under vacuum. The crystalline residue is suspended in 2400 parts of petroleum ether, collected on a filter and dried. β-bromo-β-(3-cyclohexyl-4-hydroxybenzoyl)propionic acid melts at about 166° C. (with decomposition) after recrystallization from toluene or benzene.

290 parts of β-bromo-β-(3-cyclohexyl-4-hydroxybenzoyl)propionic acid and 125 parts of anhydrous sodium acetate are refluxed and agitated with 1000 parts of glacial acetic acid for 30 minutes. The hot mixture is poured into 10,000 parts of ice water. The precipitate of β-(3-cyclohexyl-4-hydroxybenzoyl)acrylic acid is separated, washed with water and dried. After recrystallization from acetic acid it melts at about 206° C. (with decomposition).

*Example 16*

To 455 parts of β-(5-cyclohexyl-2-hydroxybenzoyl)propionic acid in 4550 parts of glacial acetic acid at 60° C. are added with good agitation 264 parts of bromine in 600 parts of glacial acetic acid over 30 minutes. The solution is agitated at 60° C. for 30 minutes more and then stripped of solvent in vacuo. The oily residue of β-bromo-β(5 - cyclohexyl - 2 - hydroxybenzoyl)-propionic acid is taken up in 2400 parts of petroleum ether, filtered and evaporated. The residue of β-bromo-β-(5-cyclohexyl-2-hydroxybenzoyl)propionic acid is used in the next step.

The bromo acid prepared above is dissolved in 1800 parts of glacial acetic acid containing 225 parts of fused sodium acetate and refluxed for 30 minutes. During the dehydrobromination β-(5-cyclohexyl - 2 - hydroxybenzoyl)acrylic acid is formed. This material cyclizes during the reaction to 6-cyclohexyl - 4 - chromanone-2-carboxylic acid. The hot mixture is poured into 10,000 parts of ice water and the granular precipitate is separated and dried. After crystallization from a mixture of toluene and cyclohexane this acid melts at about 156° C.

*Example 17*

10 parts of β-(2-methoxy-5-cyclobutylbenzoyl)propionic acid are mixed with 150 parts of hydriodic acid (sp. g. 1.7) and 30 parts of acetic anhydride and the mixture is heated to reflux. The acid dissolves during the reaction. At the end of 20 minutes the hot solution is poured into 200 parts of ice water. The precipitate of β-(2-hydroxy - 5 - cyclobutylbenzoyl)propionic acid is separated and dried.

*Example 18*

A suspension of 162 parts of p-cyclobutylanisole and 105 parts of succinic anhydride in 1200 parts of nitrobenzene is chilled to about 0° C. and 282 parts of anhydrous aluminum chloride are added in portions with good agitation and cooling at a rate such that the temperature does not rise above 4° C. The reaction mixture is agitated for 2 hours longer at about 0° C. and then for 15 hours at room temperature. It is then poured on an excess of ice and hydrochloric acid. The solvent is removed by steam distillation and the residue is chilled and the aqueous layer removed by decantation. The residue of crude β-(2-methoxy - 5 - cyclobutylbenzoyl)propionic acid is dissolved in 3500 parts of 3% sodium carbonate solution at 85° C. The hot solution is filtered, cooled, extracted with ether, and then steamed to remove residual ether. The solution is then chilled and acidified. The precipitate of β-(2-methoxy-5-cyclobutylbenzoyl)-propionic acid is triturated with water, collected on a filter, rinsed thoroughly with water and dried.

*Example 19*

A solution of 155 parts of o-cyclohexylanisole in 500 parts of chlorobenzene is heated to 90° C. and 121.5 parts of sulfuryl chloride is added over a thirty-minute period with good agitation. The liberation of hydrogen chloride begins promptly after the addition of sulfuryl chloride is started. The reaction mixture is heated and agitated for 15 hours at 90° C., at the end of which time the evolution of hydrogen chloride virtually ceases. The mixture is then cooled, washed with three 200-part portions saturated sodium bicarbonate solution and then with water. The chlorobenzene is removed under vacuum and the residual oil of 2-cyclohexyl-4-chloroanisole is distilled at about 120° C. at 0.3 mm. pressure.

A mixture of 67.5 parts of 2-cyclohexyl-4-chloroanisole and 30 parts of succinic anhydride in 360 parts of nitrobenzene is cooled to about 0° C. and agitated while 80.4 parts of anhydrous aluminum chloride are added portionwise, the temperature being maintained below 5° C. After the addition is complete, the reaction mixture is agitated for 4 hours longer at ice temperature and then allowed to stand for about 15 hours during which time the ice melts and the reaction mixture warms up to room temperature. It is finally hydrolyzed by addition to an excess of ice and hydrochloric acid. The solvent is removed by steam distillation. The distillate is separated to remove the solvent layer and the latter is extracted with dilute sodium carbonate solution. The alkaline extract upon acidification deposits a nearly colorless precipitate of β-(2-hydroxy-3-cyclohexyl-5-chlorobenzoyl)propionic acid. This material is recrystallized from toluene and forms colorless crystals melting at about 174° C.

*Example 20*

A solution of 283 parts of cyclohexylresorcinol dimethyl ether (1-cyclohexyl-2,4-dimethoxybenzene) and 127 parts of maleic anhydride in 1570 parts of nitrobenzene is agitated and chilled to about 0° C. and then 348 parts of anhydrous aluminum chloride are added at such a rate that the temperature is maintained below 5° C. with external cooling. The reaction mixture is then stirred at about 5° C. for 4 hours and left at room temperature for 4 hours. It is then poured on an excess of ice and hydrochloric acid and the solvent is removed by steam distillation. The residue is chilled and the aqueous mother liquor discarded. The residue is broken up, triturated with water, collected on a filter, rinsed with water and then dissolved in 20,000 parts of water at room temperature containing 200 parts of sodium carbonate solution. The solution thus obtained is acidified and the dark yellow, granular precipitate is collected on a filter, rinsed with water, and dried at room temperature. The product is then recrystallized from ethyl acetate, using activated charcoal, and bright yellow crystals of β-(2,4-dimethoxy-5-cyclohexylbenzoyl)-acrylic acid melting at 213–214° C. (with decomposition) are obtained.

*Example 21*

35.2 parts of p-cyclopentylanisole and 21 parts of succinic anhydride are suspended in 240 parts of nitrobenzene and cooled to about 0° C. Then 56.3 parts of anhydrous aluminum chloride are added with good agitation and cooling over about 30 minutes at a rate such that, with external cooling, the temperature does not rise above 5° C. The mixture is stirred for one hour longer at about 0° C. and then allowed to stand overnight with the temperature rising to room temperature. The reaction mixture is decomposed with ice and hydrochloric acid. The solvent is removed by steam distillation and the residue is chilled and the aqueous layer decanted. The dark residue is dissolved in 1000 parts of water at about 90° C. containing 30 parts of sodium carbonate. The solution is filtered, chilled, extracted with ether, and then heated to about 90° C. to expel ether. The aqueous solution is then chilled and acidified, and the granulated precipitate of β-(2-methoxy-5-cyclopentylbenzoyl)propionic acid is triturated with water, filtered, rinsed with water, and dried at 80° C. The acid so obtained is recrystallized from methanol in the presence of activated charcoal to give nearly colorless crystals of β-(2-methoxy-5-cyclopentylbenzoyl)propionic acid melting at about 146–147° C.

Example 22

65 parts of β-(2-methoxy-5-cyclopentylbenzoyl)propionic acid, 250 parts of acetic anhydride, and 100 parts of 47% hydriodic acid are mixed and heated to reflux temperature for 20 minutes. The resulting clear solution is poured into 3,000 parts of ice water and the granular precipitate of β-(2-hydroxy-5-cyclopentylbenzoyl)propionic acid is collected on a filter, rinsed with water, and dried at 75° C. After recrystallization from 70% acetic acid in the presence of activated charcoal, the acid is obtained as colorless crystals melting at about 109° C.

Example 23

A mixture of 111 parts of β-(2,4-dimethoxy-5-cyclohexylbenzoyl)propionic acid, 460 parts of acetic anhydride, and 1750 parts of 47% hydriodic acid is refluxed for 35 minutes. The hot suspension is poured on an excess of ice water and the granular precipitate of β-(2,4-dihydroxy-5-cyclohexylbenzoyl)propionic acid is collected on a filter, washed with water, and dried at 75° C. After recrystallization from acetic acid and methanol in the presence of activated charcoal, there are obtained colorless crystals of this acid melting at about 180° C.

Example 24

A mixture of 85 parts of β-(2,4-dimethoxy-3-cyclohexylbenzoyl)propionic acid, 300 parts of acetic anhydride, and 1250 parts of 47% hydriodic acid is refluxed for 40 minutes and then poured on to a mixture of ice and water. The granular precipitate of β-(2,4-dihydroxy-3-cyclohexylbenzoyl)propionic acid is collected on a filter, rinsed with water, and dried at room temperature. After recrystallization from 70% acetic acid in the presence of activated charcoal, colorless crystals of this acid melting at 169–170° C. are obtained.

Example 25

A solution of 42 parts of 1,3-dimethoxy-2-cyclohexylbenzene and 20 parts of succinic anhydride in 240 parts of nitrobenzene is chilled to 0° C. and then treated portionwise with 54 parts of anhydrous aluminum chloride with good agitation and chilling, the temperature being maintained below 3° C. The reaction mixture is then agitated for ½ hour longer at 0° C. and then at 20–25° C. for four hours. The reaction mixture is hydrolyzed with acid and ice, steam distilled to remove solvent, chilled, and the aqueous solution decanted. The semi-solid residue of β-(2,4-dimethoxy-3-cyclohexylbenzoyl)propionic acid is taken up in 1000 parts of water at 65° C. containing 16 parts of sodium hydroxide. The solution is chilled and filtered and the filtrate is acidified. A granular precipitate of β-(2,4-dimethoxy-3-cyclohexylbenzoyl)propionic acid separates, which is triturated in water, filtered, washed with water and dried at 75° C. This material is recrystallized from methanol in the presence of activated charcoal and forms colorless crystals melting at 142.5–143° C.

Example 26

A suspension of 256 parts of cyclopentylresorcinol dimethyl ether (1-cyclopentyl-2,4-dimethoxy-benzene) and 130 parts of succinic anhydride in 1500 parts of nitrobenzene is chilled to about 0° C. The suspension is agitated and cooled and 348 parts of anhydrous aluminum chloride are added at such a rate that the temperature does not rise above 4° C. The reaction mixture is then stirred for ½ hour longer at 0° C. and then at 20–24° C. for 6 hours. The reaction mixture is worked up as in Example 25. There is thus obtained nearly colorless crystals of β-(2,4-dimethoxy-5-cyclopentylbenzoyl)-propionic acid melting at about 137° C., after recrystallization from methanol in the presence of activated charcoal.

Example 27

A mixture of 65 parts of β-(2,4-dimethoxy-5-cyclopentylbenzoyl)propionic acid, 250 parts of acetic anhydride, and 1100 parts of 50% hydriodic acid is refluxed for 30 minutes. The clear solution is then poured on an excess of ice and water and the granular precipitate of β-(2,4-dihydroxy-5-cyclopentylbenzoyl)-propionic acid is collected on a filter, washed with water, and dried. After recrystallization from 70% acetic acid, using decolorizing charcoal, there are obtained colorless crystals of this acid melting at about 169° C.

Example 28

A solution of 125 parts of p-cyclohexylanisole and 56 parts of phenylsuccinic anhydride in 400 parts of nitrobenzene is chilled to about 0° C. and 112 parts of anhydrous aluminum chloride are added with good agitation and cooling at such a rate that the temperature does not rise above 3° C. The mixture is agitated for 15 hours longer, during which time it rises to a temperature of about 24° C. It is then allowed to stand at room temperature for 2 days, after which it is hydrolyzed with an excess of acid and ice, steam distilled to remove solvent, chilled and decanted to remove the aqueous phase. The viscous residue of crude α-phenyl-β-(2-methoxy-5-cyclohexylbenzoyl)propionic acid is dissolved in 2000 parts of water at 65° C. containing 30 parts of potassium hydroxide. The hot solution is filtered, chilled, washed with ether, and steamed to remove residual ether. The aqueous solution is again chilled and then acidified. The precipitate of the purified acid is triturated with water, collected on a filter, washed with water and dried. The acid is then dissolved in 1200 parts of 10% potassium hydroxide solution and treated dropwise with 190 parts of dimethyl sulfate with good agitation at room temperature. The mixture is then heated to 80° C. for one hour, cooled to about 65° C. and treated with a solution of 56 parts of potassium hydroxide in 100 parts of water and 63 parts of dimethyl sulfate. The heating and agitation are continued for one hour. Then the aqueous solution is acidified and the granular precipitate of α-phenyl-β-(2-methoxy-5-cyclohexylbenzoyl)propionic acid is triturated with water, collected on a filter, washed with water, and dried at room temperature. The acid is then refluxed with about 600 parts of cyclohexane to remove impurities. The colorless crystalline residue is then collected on filter, washed with cold cyclohexane, and dried at 75° C. This purified acid after recrystallization from methanol or ethyl acetate forms white crystals melting at about 174° C.

Example 29

A mixture of 10 parts of α-phenyl-β-(2-methoxy-5-cyclohexylbenzoyl)propionic acid, 25 parts of acetic anhydride and 120 parts of hydriodic acid (specific gravity 1.7) is refluxed for 25 minutes and then poured onto an excess of ice and water. The precipitate of crude α-phenyl-β-(2-hydroxy-5-cyclohexylbenzoyl)propionic acid is removed, washed with water, and dissolved in 300 parts of 1% sodium hydroxide solution. The alkaline solution is extracted with ether, steamed to remove excess ether, chilled and acidified. The white precipitate of the purified acid is granulated, separated and dried. After recrystallization from methanol in the presence of activated carbon, there are obtained fine white crystals of α-phenyl-β-(2-hydroxy-5-cyclohexylbenzoyl)propionic acid melting at 165–166° C.

Example 30

165 parts of α-phenyl-β-(2-methoxy-5-cyclohexylbenzoyl)propionic acid are dissolved in 900 parts of hot isopropyl alcohol and 67.7 parts of β-diethylaminoethyl chloride are added and the solution refluxed for 5 hours with good agitation. The reaction mixture is cooled, filtered, and the filtrate is evaporated under vacuum. The residue of β-diethylaminoethyl α-phenyl-β-(2-methoxy-5-cyclohexylbenzoyl)propionate hydrochloride is taken up in 3000 parts of water and treated with an excess of 10% sodium hydroxide solution. The aqueous mixture is then extracted with ether and the ether extract is washed with water, dried over anhydrous sodium sulfate, and evaporated. The residue of the basic ester is dissolved in 2100 parts of absolute ether and treated with one equivalent of absolute alcoholic hydrogen chloride. The hydrochloride crystallizes on standing. It is triturated with ether, filtered, rinsed with ether, and dried in vacuum over sodium hydroxide. After recrystallization from ethyl acetate, β-diethylaminoethyl α-phenyl-β-(2-methoxy-5-cyclohexylbenzoyl)propionate hydrochloride melt at about 115° C.

Example 31

551 parts of p-cyclohexylanisole and 331 parts of methylsuccinic anhydride are dissolved in 3500 parts of nitrobenzene and chilled to 0° C. Then 777 parts of anhydrous aluminum chloride are added in portions with efficient cooling and agitation so that the temperature does not rise above 3° C. The reaction mixture is worked up as in Example 21. There is thus obtained α-methyl-β-(2-methoxy-4-cyclohexylbenzoyl)propionic acid melting at about 151° C., after recrystallization from methanol in the presence of activated carbon.

Example 32

660 parts of cyclohexylresorcinol dimethyl ether and 345 parts of methylsuccinic anhydride in 3600 parts of nitrobenzene are reacted with 804 parts of anhydrous aluminum chloride as in Example 31. The reaction mixture is worked up as in Example 21 and there is obtained α-methyl-β-(2,4-dimethoxy-5-cyclohexylbenzoyl)-propionic acid which melts at about 168° C., after recrystallization from methanol in the presence of activated carbon.

Example 33

A solution of 10 parts of α-methyl-β-(2-methoxy-5-cyclohexylbenzoyl)propionic acid, 25 parts of acetic anhydride and 100 parts of 47% hydriodic acid are refluxed for 40 minutes and the solution is then poured on an excess of ice and water. The precipitate of α-methyl-β-(2-hydroxy-5-cyclohexylbenzoyl)propionic acid is collected on a filter, washed with water, and then recrystallized from 70% acetic acid in the presence of activated charcoal. The product so obtained melts at about 126° C.

Example 34

65 parts of α-methyl-β-(2,4-dimethoxy-5-cyclohexylbenzoyl)propionic acid is demethylated by refluxing for ½ hour with 250 parts of acetic anhydride and 1050 parts of 47% hydriodic acid. α-Methyl-β-(2,4-dihydroxy-5-cyclohexylbenzoyl)propionic acid is isolated as in Example 33 and melts at 179° C. after recrystallization from methanol in the presence of activated carbon.

Example 35

A solution of 82 parts of cyclohexylresorcinol diethyl ether in 330 parts of tetrachloroethane is cooled to about −2° C. Then 44.7 parts of anhydrous aluminum chloride are added with good agitation and cooling, the temperature being maintained below 0° C. To the agitated mixture are added 50.2 parts of β-carbo-methoxypropionyl chloride with good agitation, and cooling the temperature being kept below 0° C. The reaction mixture is stirred for 4 hours longer at about 0° C. and then at 14–16° C. for 6 hours. The reaction mixture is then decomposed with an excess of ice and hydrochloric acid and allowed to stand in the cold. The tetrachloroethane layer is separated and washed twice with water. The solvent is then removed under vacuum and the residue is refluxed for 30 minutes with a solution of 24 parts of sodium hydroxide in 215 parts of methanol. Most of the solvent is then removed under vacuum and the residue is taken up in 600 parts of water, washed twice with ether to remove neutral material, steamed to remove residual ether, chilled, and acidified. A granular precipitate of β-(2,4-diethoxy-5-cyclohexylbenzoyl)propionic acid is collected on a filter, washed with water, and dried at 80° C. This acid after recrystallization from methanol in the presence of activated carbon melts at about 176° C.

Example 36

20 parts of 3-methyl-4-cyclohexylanisole and 10.5 parts of succinic anhydride are suspended in 125 parts of nitrobenzene and chilled to about 0° C. Then 28 parts of anhydrous aluminum chloride are added in portions with good agitation and chilling at a rate such that the temperature does not rise above 5° C. The reaction mixture is then agitated at 0–5° C. for one hour and at 20–24° C. for 14 hours. It is then decomposed with ice and acid, steam distilled to remove solvent, chilled and decanted. The crude residue of β-(2-methoxy-4-methyl-5-cyclohexylbenzoyl)propionic acid is dissolved in 340 parts of 3% sodium carbonate solution at 90° C. The hot solution is treated with activated carbon, filtered, chilled, washed with ether, heated to 85° C. to remove residual ether, chilled and acidified. The precipitate of purified β-(2-methoxy-4-methyl-5-cyclohexylbenzoyl)propionic acid is triturated with cold water, collected on a filter, rinsed with water and dried.

I claim:
1. A cyclohexylbenzoylpropionic acid of the formula

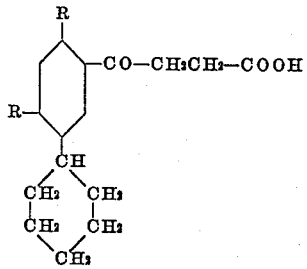

wherein one R is a member of the group consisting of hydroxyl and methoxyl radicals and the other R is a member of the group consisting of hydrogen, hydroxyl and methoxyl radicals.

2. $\beta$ - (2,4-dihydroxy-5-cyclohexylbenzoyl) propionic acid.

3. $\beta$ - (2,4-dimethoxy-5-cyclohexylbenzoyl) propionic acid.

4. $\beta$ - (2 - hydroxy - 5 - cyclohexylbenzoyl) propionic acid.

5. $\beta$ - (2 - methoxy - 5-cyclohexylbenzoyl) propionic acid.

ROBERT R. BURTNER.

References Cited in the file of this patent
UNITED STATES PATENTS

| Number | Name | Date |
| --- | --- | --- |
| 2,580,402 | Burtner | Jan. 1, 1952 |